(12) United States Patent
Arnold (10) Patent No.: US 8,988,467 B2
(45) Date of Patent: Mar. 24, 2015

(54) TOUCHSCREEN SELECTION VISUAL FEEDBACK

(75) Inventor: Jeffery Arnold, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 13/273,123

(22) Filed: Oct. 13, 2011

(65) Prior Publication Data

US 2013/0093791 A1 Apr. 18, 2013

(51) Int. Cl.
*G06T 3/60* (2006.01)
*G06F 3/0484* (2013.01)
*G06F 3/0488* (2013.01)

(52) U.S. Cl.
CPC ........ *G06F 3/04845* (2013.01); *G06F 3/04883* (2013.01); *G06F 2203/04806* (2013.01)
USPC .......................................... 345/650

(58) Field of Classification Search
None
See application file for complete search history.

(56) References Cited

U.S. PATENT DOCUMENTS

| | | | | |
|---|---|---|---|---|
| 5,729,673 | A * | 3/1998 | Cooper et al. | 345/427 |
| 6,549,683 | B1 * | 4/2003 | Bergeron et al. | 382/298 |
| 6,674,484 | B1 * | 1/2004 | Boland et al. | 348/580 |
| 7,219,769 | B2 * | 5/2007 | Yamanouchi et al. | 187/227 |
| 8,217,956 | B1 * | 7/2012 | Jin | 345/585 |
| 2001/0033295 | A1 | 10/2001 | Phillips | |
| 2004/0164957 | A1 * | 8/2004 | Yamaguchi et al. | 345/156 |
| 2005/0024322 | A1 | 2/2005 | Kupka | |
| 2006/0190833 | A1 | 8/2006 | SanGiovanni et al. | |
| 2008/0180404 | A1 | 7/2008 | Han et al. | |
| 2008/0313538 | A1 | 12/2008 | Hudson | |
| 2009/0091542 | A1 | 4/2009 | Inaba et al. | |
| 2010/0026721 | A1 | 2/2010 | Park et al. | |
| 2010/0156656 | A1 | 6/2010 | Duarte et al. | |
| 2010/0156818 | A1 | 6/2010 | Burrough et al. | |
| 2010/0162181 | A1 * | 6/2010 | Shiplacoff et al. | 715/863 |
| 2010/0259493 | A1 | 10/2010 | Chang et al. | |
| 2010/0299599 | A1 | 11/2010 | Shin et al. | |
| 2011/0141031 | A1 | 6/2011 | McCullough et al. | |
| 2011/0175821 | A1 * | 7/2011 | King | 345/173 |

(Continued)

FOREIGN PATENT DOCUMENTS

CN 101957714 A 1/2011

OTHER PUBLICATIONS

Craddock, et al., "Size-Sensitive Perceptual Representations Underlie Visual and Haptic Object Recognition", Retrieved at <<http://www.plosone.org/article/info%3Adoi%2F10.1371%2Fjournal.pone.0008009>>, PLoS One, Nov. 4, 2009, pp. 19.

(Continued)

*Primary Examiner* — James A Thompson
*Assistant Examiner* — Xilin Guo
(74) *Attorney, Agent, or Firm* — Aaron Chatterjee; Kate Drakos; Micky Minhas (57) ABSTRACT

Various embodiments are described for systems and methods for providing visual feedback indicating a touch selection of an element on a touch-sensitive display. In one example, the method may include displaying the element in a first orientation on the display. A rotation scaling factor may be established that is based on a distance between an element, point of reference and a display point of reference. Based on the rotation scaling factor, a rotation amount of the element is determined. When a touch selection of the element is received, the method includes rotating the element by the rotation amount to a second orientation, and displaying the element in the second orientation on the display.

20 Claims, 3 Drawing Sheets

(56) References Cited

U.S. PATENT DOCUMENTS

| | | | | |
|---|---|---|---|---|
| 2011/0246891 | A1* | 10/2011 | Schubert et al. | 715/719 |
| 2012/0001943 | A1* | 1/2012 | Ishidera | 345/659 |
| 2012/0007985 | A1* | 1/2012 | Inui et al. | 348/148 |
| 2012/0105486 | A1* | 5/2012 | Lankford et al. | 345/661 |
| 2012/0113489 | A1* | 5/2012 | Heit et al. | 358/518 |
| 2012/0162103 | A1* | 6/2012 | Kobayashi et al. | 345/173 |
| 2012/0257072 | A1* | 10/2012 | Jirman | 348/222.1 |
| 2013/0127825 | A1* | 5/2013 | Joshi | 345/419 |

OTHER PUBLICATIONS

Malik, et al., "Visual Touchpad: A Two-handed Gestural Input Device", Retrieved at <<http://citeseerx.ist.psu.edu/viewdoc/download?doi=10.1.1.64.4689&rep=rep1&type=pdf>>, Proceedings of the 6th international conference on Multimodal interfaces, Oct. 13-15, 2004, pp. 289-296.

Lawson, Rebecca., "A Comparison of the Effects of Depth Rotation on Visual and Haptic Three-Dimensional Object Recognition", Retrieved at <<http://psycnet.apa.org/journals/xhp/35/4/911>>, Journal of Experimental Psychology: Human Perception and Performance, vol. 35, No. 4, Aug., 2009, p. 1.

Brivio, et al., "Browsing Large Image Datasets through Voronoi Diagrams", Retrieved at <<http://ieeexplore.ieee.org/stamp/stamp.jsp?arnumber=05613466>>, IEEE Transactions on Visualization and Computer Graphics, vol. 16, No. 6, Nov.-Dec. 2010, pp. 1261-1270.

"Tilt Effect Overview for Windows Phone," Microsoft, http://msdn.microsoft.com/en-us/library/ff941094(v=vs.92).aspx, Jan. 13, 2012, 2 pages.

"International Search Report", Mail Date: Mar. 29, 2013, Application No. PCT/US2012/060113, Filed date: Oct. 12, 2012, pp. 9.

The State Intellectual Property Office of the People's Republic of China, First Office Action and Search Report Issued in Chinese Patent Application No. 201210388960.0, Dec. 31, 2014, 11 pages.

* cited by examiner

Fig. 1

TOUCHSCREEN SELECTION VISUAL FEEDBACK

BACKGROUND

Touchscreen devices may provide information, graphics, video and other content via a touch-sensitive display. Some touchscreen devices utilize a virtual rendering camera having a perspective angle projection matrix. Such a camera uses perspective projection to render graphics, objects and/or other content. With perspective projection, objects positioned near the virtual camera appear larger than objects positioned at a distance from the virtual camera, thereby creating a realistic viewing experience for the user.

Touchscreen devices also typically employ a mechanism for indicating to a user that a user's touch has been received by the device. Such indication may take the form of an aural and/or visual cue that is provided to the user upon receipt of the user's touch. With respect to visual cues one approach provides a fixed maximum rotation value for the item for touch locations along a lateral edge of the item. However, in touchscreen devices using a virtual camera having a perspective angle projection matrix, providing such a fixed maximum rotation value may result in undesired outcomes. For example, the rendering camera's perspective angle projection matrix may cause exaggerated rotation of relatively wide or tall objects having a side near an edge of the screen, leading to visual incongruity with the perspective environment and possible collisions with adjacent objects. These and other undesired outcomes generally result in less than satisfactory touch feedback experiences for the user.

SUMMARY

To address the above issues, computing devices and methods for providing visual feedback indicating a touch selection of an element on a touch-sensitive display are disclosed. In one example, the element is rotatable upon receiving the touch selection. A graphical user interface (GUT) is provided on the display by a rendering engine program having a render camera with an axis of projection intersecting a display point of reference.

The method may comprise displaying the element in a first orientation on the display. The method includes establishing an element position rotation scaling factor that is based on at least a distance between an element point of reference and the display point of reference. Based on the element position rotation scaling factor, the method includes determining a rotation amount of the element. The method further includes receiving the touch selection of the element via the user touching a surface of the display. The method additionally includes rotating the element by the rotation amount to a second orientation, and displaying the element in the second orientation on the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore the claimed subject matter is not limited to implementations that solve any or all disadvantages noted in any part of this disclosure.

DETAILED DESCRIPTION

Figure 1:
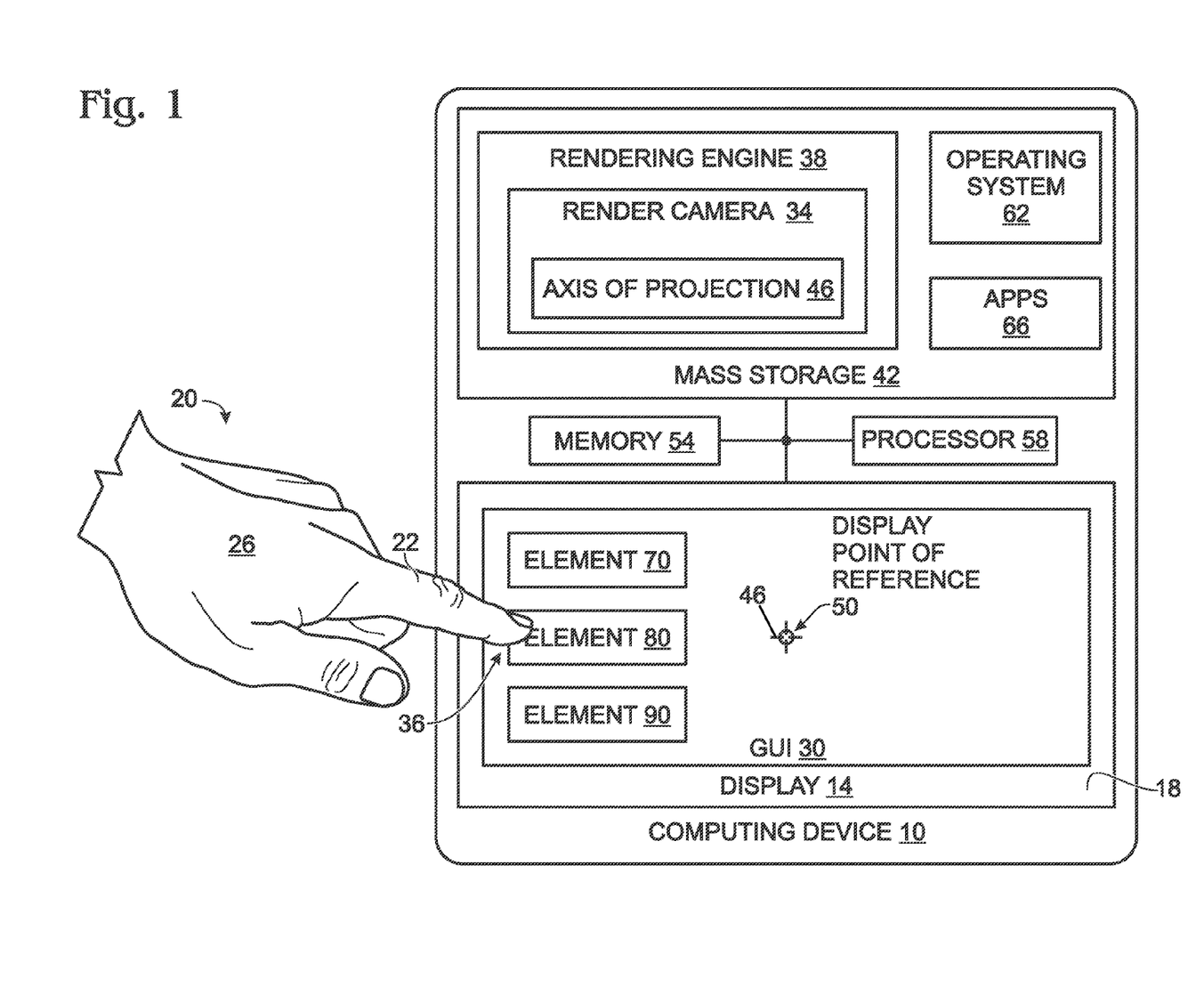
FIG. 1 is a schematic view of a computing device for providing visual feedback to a user according to an embodiment of the present disclosure.

Aspects of this disclosure will now be described by example and with reference to the illustrated embodiments listed above. FIG. 1 is a schematic view of a computing device 10 that includes a touch-sensitive display 14 having a touch-sensitive surface 18 according to one embodiment of the present disclosure. The touch-sensitive display 14 may utilize capacitive, resistive, surface acoustic wave, or any other suitable touchscreen technology to detect the presence and location of a user's touch within the display area. In the following description, a user 20 is indicated by the user's hand 26. A user's touch may be delivered to the display surface 1$ by, for example, the user's finger 22, the user's hand 26, a stylus, or any other suitable object or instrument touching the display surface 18.

The computing device 10 may include a GUI 30 that is displayed by a virtual render camera 34. The GUI 30 may include one or more elements that are displayed on the touch-sensitive display 14. In one example shown in FIG. 1, the GUI may include a first element 70, a second element 80 and a third element 90. In this example, the user 20 is illustrated as making a touch selection 36 of the second element 80. It will be appreciated that different numbers of elements may be displayed on the touch-sensitive display 14, such as 1, 2, 4, 5, or other suitable numbers of elements. It will also be appreciated that the elements may have various shapes, forms, symmetries and/or other configurations, and are not limited to the rectilinear polygon shapes that are illustrated.

The render camera 34 may be a component of a rendering engine program 38 within mass storage 42 of the computing device 10. The render camera 34 may also include an axis of projection 46 that intersects with a display point of reference 50 on the display 14 and within the GUI 30. For ease of description, the axis of projection 46 is shown in FIG. 1 as a module of render camera 34 and as cross hairs intersecting the display point of reference 50 on the display 14.

In addition to mass storage 42, the computing device 10 may also include memory 54 and a processor 58. Operating system 62, applications 66, and other programs stored in mass storage 42 may be executed by the processor 58 using memory 54 to achieve various functions described herein. In other embodiments computing device 10 may include other components not shown in FIG. 1, such as user input devices including keyboards, mice, game controllers, cameras, and/or microphones, for example. Computer readable media may be provided that include stored instructions to implement the various software components described herein, as described below.

Figure 2:
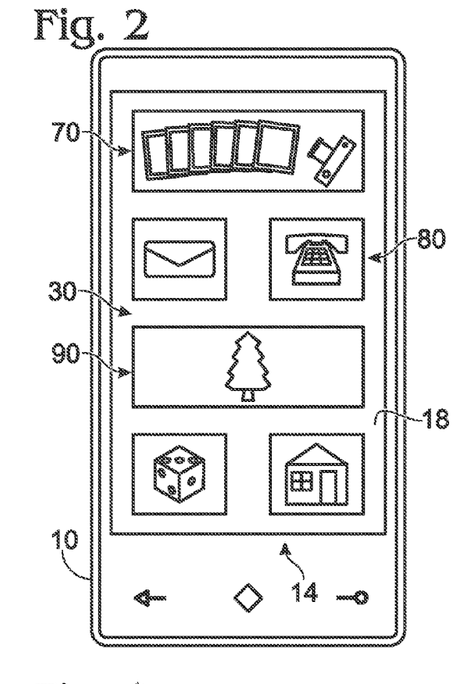
FIG. 2 is a schematic view of GUI on a touch-sensitive display of a computing device according to an embodiment of the present disclosure.

Turning now to FIG. 2, a schematic view of one example of the GUI 30 displayed on the display 14 of the computing device 10 of FIG. 1 is provided. In this example, the GUI 30 includes multiple graphical elements that each correspond to a different application. For example, the first element 70 may correspond to a digital photo application for organizing, viewing and/or sharing digital photos. The second element 80 may correspond to a mobile phone application for making and receiving mobile phone calls. The third element 90 may correspond to a school reference application that provides information regarding class scheduling, school activities, etc. A user may launch an application by touching the corresponding element on the display 14.

Figure 3:
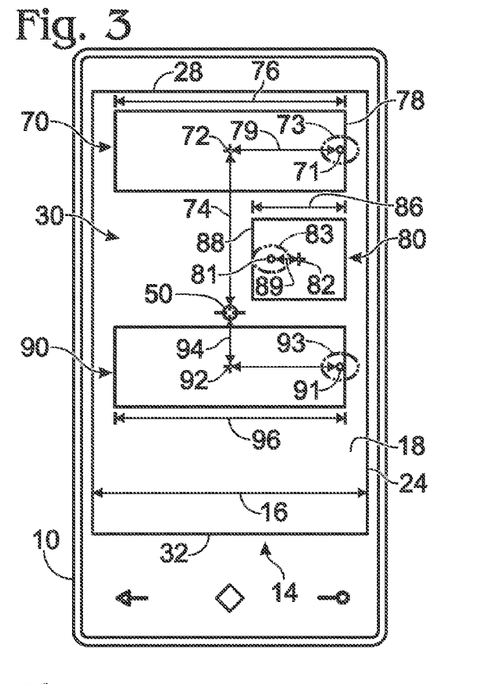
FIG. 3 is a schematic view of the GUI of FIG. 2 showing elements of the GUI in a first orientation on the display.

Turning now to FIG. 3, a schematic view of the GUI 30 of FIG. 2 showing only the first element 70, second element 80 and third element 90 is provided. In this example, the rendering engine program 38 is configured to display each of the first element 70, second element 80 and third element 90 in a first orientation on the display 14.

As indicated above, a user may select the application associated with one of the elements by touching the corresponding element. The position of the user's touch selection on the element may be referred to as the selection position on the element. For example, in FIG. 3 the first element 70 is shown with a first selection position 71, the second element 80 is shown with a second selection position 81, and the third element 90 is shown with a third selection position 91.

Where the user 20 uses a finger 22 to make the touch selections, a larger touch selection area surrounding each selection position is indicated. For example, in FIG. 3 the first selection position 71 is within a first touch selection area 73, the second selection position 81 is within a second touch selection area 83, and the third selection position 91 is within a third touch selection area 93. As described in more detail below, when a user 20 makes a touch selection of an element, the element may be rotated and/or scaled down in size to provide visual feedback to the user 20 indicating that the touch selection of the element has been received by the computing device 10.

To provide consistent and realistic visual feedback of a touch selection of an element, the rendering engine program 38 may be configured to establish an element position rotation scaling factor that is used to determine a rotation amount by which to rotate the element. In one example, the element position rotation scaling factor may be based on a distance between an element point of reference and the display point of reference 50. With reference to FIG. 3 and first element 70, a first element point of reference 72 may be established at the center of the first element. The first element point of reference 72 is located a distance 74 from the display point of reference 50. Similarly, a second element point of reference 82 of the second element 80 may be established at the center of the second element. A third element point of reference 92 of the third element 90 may be established at the center of the third element. The third element point of reference 92 is located a distance 94 from the display point of reference 50. It will be appreciated that the position of an element may be established by reference to another characteristic or aspect of the element, such as the centroid of the shape of the element, or any other suitable characteristic of the element.

In one example, the rotation amount may be determined by multiplying a maximum rotation by the element position rotation scaling factor. The maximum rotation may be determined by comparing an element size to a size of the display 14. For example, regarding the first element 70, the element size may be the element width 76 of the horizontal sides of the element. Similarly, the size of the display 14 may be the horizontal display width 16 of the display.

In one example, the maximum rotation may vary between about 25 degrees when the element width is less than or equal to about 25% of the display width, and about 10 degrees when the element width is about 100% of the display width. In this manner, a larger maximum rotation is provided for elements that are smaller as compared to the display size, thereby providing enhanced visibility of the rotation of the element to a user. Beginning at 10 degrees, the maximum rotation may increase between 10 degrees and 25 degrees as the element width to display width ratio decreases from 100% to 25%. In a more specific example, beginning at 10 degrees the maximum rotation may increase in increments of 3.75 degrees up to 25 degrees. Beginning with an element width to display width ratio of 100%, each 3.75 degree increment may occur for every 15% decrease in such ratio, down to a ratio of 25%, with the maximum rotation remaining at 25 degrees when the ratio is ≤25%.

With reference to one example shown in FIG. 3, if the ratio of the element width 76 of the first element 70 to the display width 16 is about 85%, then the maximum rotation would be 13.75 degrees. In another example, if the ratio of the element width 86 of element 80 to the display width 16 is about 33%, then the maximum rotation would be 25 degrees. In another example, if the ratio of the element width 96 of element 90 to the display width 16 is about 85%, then the maximum rotation would be 13.75 degrees.

Turning now to the element position rotation scaling factor, the element position rotation scaling factor may vary between about 1.0 when the distance between the element point of reference and the display point of reference is about 0, and about 0.333 when the distance between the element point of reference and the display point of reference is about a maximum value. The element position rotation scaling factor may decrease from about 1.0 to about 0.333 as the distance between the element point of reference and the display point of reference increases from 0 to the maximum value. In one example where the display point of reference 50 is the center of the display 14, the maximum value of the distance between the element point of reference and the center of the display corresponds to the element point of reference being at an edge of the display.

In a more specific example, the element position rotation scaling factor may be 1.0 where the distance between the element point of reference and the center of the display 14 is about 0. The element position rotation scaling factor may decrease in increments of about 0.074 for every 1.0% incremental. increase in distance between the element point of reference and the center of the display. In this example, the incremental increase may be a percentage based on the distance from the display point of reference 50 at the center of the display 14 to an edge 28 of the display. For example, and with reference now to first element 70 in FIG. 3, if the distance 74 between the first element point of reference 72 and the display point of reference 50 is about 65% of the distance between the display point of reference and edge 28 of the display 14, then the element position rotation scaling factor would be about 0.556 for the first element. In another example referring to the third element 90, if the distance 94 between the third element point of reference 92 and the display point of reference 50 is about 24% of the maximum distance between the display point of reference and edge 32 of the display 14, then the element position rotation scaling factor would be about 0.852 for the third element.

As noted above, the element position rotation scaling factor is used to determine a rotation amount by which to rotate an element upon receiving a touch selection of the element. In the examples discussed above regarding first element 70, where the maximum rotation is 13.75 degrees and the element position rotation scaling factor is 0.556, the rotation amount applied to the first element would be (13.75 degrees)* (0.556) =7.645 degrees. In the other examples discussed above regarding third element 90, where the maximum rotation is also 13.75 degrees and the element position rotation scaling factor is 0.852, the rotation amount applied to the third element would be (13.75 degrees)*(0.852)=11.715 degrees. In this manner, elements closer to the center 50 of the display 14, such as third element 90, receive a larger rotation amount as compared to similarly sized elements that are further away from the center of the display, such as first element 70.

Figure 4:
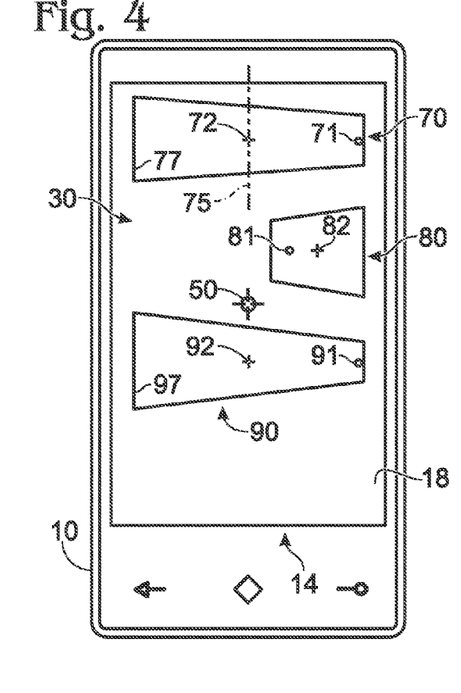
FIG. 4 is a schematic view of the GUI of FIG. 2 showing elements of the GUI in a second orientation on the display.

When the rotation amount for an element is determined, the rendering engine program 38 is configured to rotate the element by the rotation amount to a second orientation, and to display the element in the second orientation on the display 14. Turning now to FIG. 4 a schematic view of the GUI 30 of FIG. 2 showing each of the first element 70, second element 80 and third element 90 in a second orientation is provided. For purposes of description, and with reference to the elements in FIG. 4 as examples, an element may be rotated about an imaginary vertical axis, such as axis 75 in first element 70, which extends through the element point of reference, such as first element point of reference 72.

It will be appreciated that the direction of rotation of an element is selected to create a visual impression that the element is "pressed" into the display 14 by the touch selection. With reference to FIG. 4 and first element 70 having a first selection position 71, the element 70 is rotated about axis 75 such that the side of the element containing first selection position 71 appears to move away from the user 20 and into the display 14. The second element 80 and third element 90 are rotated in a similar manner to create a similar visual impression.

With continued reference to FIG. 4 and the examples described above, it can be seen that the first element 70 is rotated by a lesser rotation amount (7.645 degrees) as compared to the rotation amount for the third element 90 (11.715 degrees) that is closer to the display point of reference 50 at the center of the display 14 than the first element. In an example where the first element 70 and the third element 90 have about the same size in their first orientations, as illustrated in FIG. 3, the lesser rotation of the first element as compared to the second element, as illustrated in FIG. 4, may be visually observed by noting the different changes in lengths of the vertical sides of both elements. For example, it can be seen that a first side 77 of the first element 70 is shorter than a first side 97 of the third element 90. When combined with effects caused by the perspective angle projection matrix of the render camera, as discussed above, this helps create more consistent and realistic visual feedback indicating a touch selection of the first element 70 and the third element 90. Additionally, such consistent and realistic visual feedback is achieved independent of the resolution of the display 14.

With reference now to FIG. 3, in another example the rendering engine program may also be configured to establish a selection position rotation scaling factor that is based on a distance between the selection position and the element point of reference. The rotation amount of an element receiving a touch selection may be based on the selection position rotation scaling factor in addition to the element position rotation scaling factor. More specifically, the rotation amount may be determined by multiplying the maximum rotation by the element position rotation scaling factor and the selection position rotation scaling factor.

The selection position rotation scaling factor may vary between about 1.0 when the selection position is at an edge of the element, and about 0 when the selection position is at the element point of reference, such as the center of the element. In this manner, a larger rotation is provided as an element is selected closer to an edge of the element. Conversely, a smaller rotation is provided as an element is selected closer to the center of an element. When an element is selected at its center the selection position rotation scaling factor may be 0, resulting in no rotation of the element. By varying the selection position rotation scaling factor in this manner, a more realistic depiction of element rotation that corresponds to the selection position on the element is provided.

In one example, the selection position rotation scaling factor may decrease in increments of about 0.10 from a value of 1.0 corresponding to the selection position at an edge of the element to a value of 0 corresponding to the selection position at the center of the element. It will also be appreciated that the selection position rotation scaling factor may vary between 1.0 and 0 by any suitable gradation or function as the location of the selection position moves from an edge of the element to the center of the element.

In one example, with reference to FIG. 3 and the first element 70, the first selection position 71 may be located at an edge 78 of the first element and at a distance 79 from the first element point of reference 72 at the center of the first element. Accordingly, the selection position rotation scaling factor for this first selection position 71 would be 1.0. As described above in the example regarding first element 70, the maximum rotation may be 13.75 degrees and the element position rotation scaling factor may be 0.556 for the first element. In this example, it follows that the rotation amount applied to the first element 70 would be (13.75 degrees)*(0.556)*(1.0) =7.645 degrees.

In another example, and with reference now to the second element 80, the second selection position 81 may be located between an edge 88 of the second element and the second element point of reference 82 at a distance 89 from the second element point of reference. More specifically, the second selection position 81 may be located midway between the edge 88 and the second element point of reference 82, such that the distance 89 is 50% of the distance between the second element point of reference and the edge 88. In this example, the selection position rotation scaling factor for this second selection position 81 may be 0.50. Additionally, the maximum rotation may be 25 degrees and the element position rotation scaling factor may be 0.778. In this example, it follows that the rotation amount applied to the second element 80 would be (25 degrees)*(0.778)*(0.50)=9.725 degrees.

In another example where the element is initially displayed in a first size, the rendering engine program 38 may also be configured to scale down the first size of the element based on a location of the element relative to the display point of reference, and on a location of a selection position relative to an element point of reference. The rendering engine program 38 may establish an element position size scaling factor that is used on the distance between an element point of reference and a display point of reference. The rendering engine program may also establish a selection position size scaling factor that is based on the distance between a selection position on the element and an element point of reference.

In this example, a selected size scaling factor may be determined by selecting either the element position size scaling factor or the selection position size scaling factor, whichever is smaller. A second, scaled-down size of the element receiving a touch selection may then be determined by multiplying the first size of the element by the selected size scaling factor. The element may then be displayed in the second size on the display 14.

The element position size scaling factor may vary between about 1.0 when the element position is at the display point of reference, such as the center of the display, and about 0.925 when the element position is at an edge of the display. In this manner, a larger size reduction is provided as the element position moves away from the center of the display. Conversely, a smaller size reduction is provided as the element position moves toward the center of the display. When the element position is at the center of the display, the element position size scaling factor may be 1.0, which would result in zero size reduction of the element. Varying the element position size scaling factor in this manner may offset effects caused by the perspective angle projection matrix of the render camera 34. Accordingly, a more realistic depiction of an element being "pressed" may be provided to the user 20.

In one example, the element position size scaling factor may decrease in increments of about 0.83 from a value of about 1.0, corresponding to the element position at the center of the display, to a value of about 0.925, corresponding to the element position at an edge of the display. It will also be appreciated that the element position size scaling factor may also vary between 1.0 and 0.925 by any suitable gradation or function as the location of the element position moves the center of the display to an edge of the display.

Turning now to the selection position size scaling factor, the selection position size scaling factor may also vary between about 1.0 and about 0.925. However, the selection position size scaling factor may be about 1.0, or zero size reduction, when the selection position is at an edge of the element, and about 0.925 when the selection position is at an element point of reference, such as the center of the element. In this manner, a larger size reduction is provided as the selection position moves toward the center of the element. Conversely, a smaller size reduction is provided as the selection position moves away from the center of the element. When the selection position is at the edge of the element, the element position size scaling factor may be 1.0, which would result in zero size reduction of the element. By varying the selection position size scaling factor in this manner, a more realistic depiction of the element being "pressed" that corresponds to the selection position on the element is provided.

Figure 5:
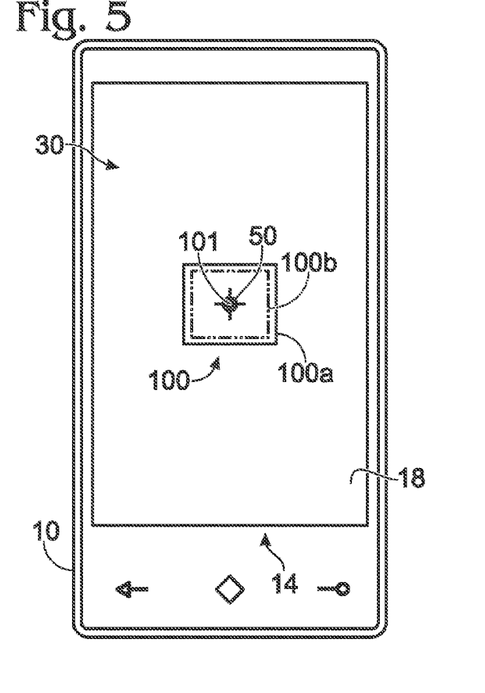
FIG. 5 is a schematic view of a GUI on a touch-sensitive display of a computing device showing an element in a first orientation and a second orientation according to an embodiment of the present disclosure.

In a more specific example, and with reference now to FIG. 5 and a fourth element 100, the fourth element may be displayed in a first size 100a and in a first orientation as illustrated in FIG. 5. The fourth element 100 may include an element point of reference 101 that is located at the display point of reference 50 that corresponds to the center the display 14. In this example, the element position size scaling factor for the element point of reference 101 is 1.0.

With regard to a selection position size scaling factor, in this example a selection position (not shown for clarity) on the fourth element 100 is at the element point of reference 101. In other words, a touch selection on element 100 is received at the element point of reference 101. Accordingly, the selection position size scaling factor for this selection position is 0.925. In this example, it follows that the selected size scaling factor applied to the fourth element 100 would be the selection position size scaling factor of 0.925, as 0.925 is smaller than 1.0. The rendering engine program 38 then displays the fourth element 100 in a second size 100b that is determined by multiplying the first size 100a by 0.925. The result is a linear transformation of the first size 100a into the smaller second size 100b by a selection position size scaling factor of 0.925. In other words, the first size 100a of the fourth element 100 is scaled down to a second size 100b by a selection position size scaling factor of 0.925, it will be appreciated that the fourth element 100 may he displayed in the second size 100b and in a second orientation that may be determined as described above.

Figure 6:
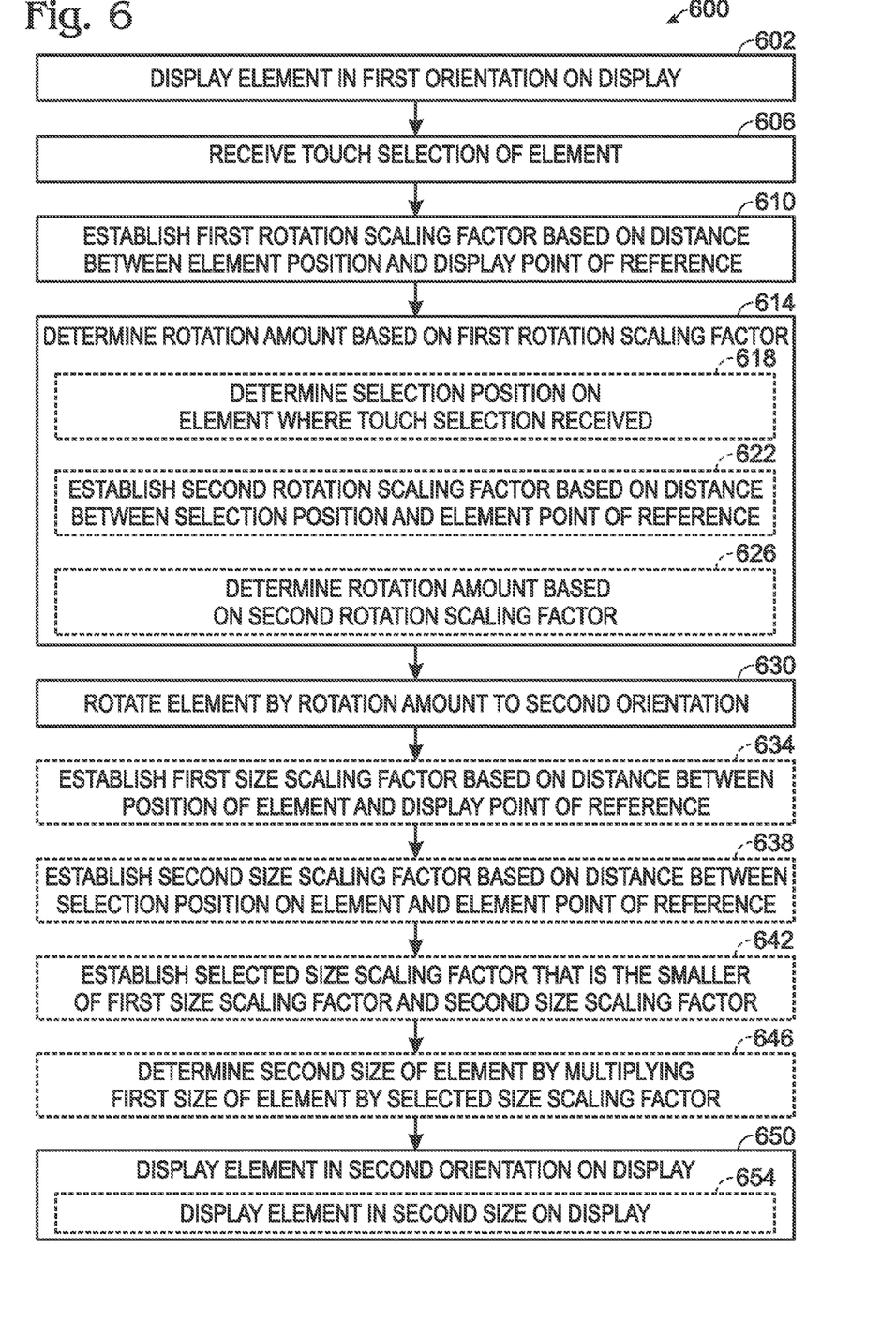
FIG. 6 is a flow chart for a method of providing visual feedback to a user indicating a touch selection of an element in a graphical user interface on a touch-sensitive display according to an embodiment of the present disclosure.

FIG. 6 is a flow chart for a method 600 of providing visual feedback to a user indicating a touch selection of an element in a graphical user interface on a touch-sensitive display according to an embodiment of the present disclosure. The following description of method 600 is provided with reference to the software and hardware components of computing device 10 described above and shown in FIG. 1. It will be appreciated that method 600 may also be performed using other suitable components.

At 602 the method may include displaying the element in a first orientation and a first size on the display 14. At 606 the method may include receiving a touch selection 36 of the element via the user 20 touching a surface 18 of the display 14. At 610 the method may include establishing a first rotation scaling factor that is based on a distance between an element position on the display 14 and the display point of reference 50. With reference to the examples described above, the element position may be determined by reference to an element point of reference on the element.

At 614 the method may include determining a rotation amount of the element based on the first rotation scaling factor. As described above, in one example the first rotation scaling factor may comprise the element position rotation scaling factor, and the rotation amount may be determined as described above with regard to the element position rotation scaling factor.

In another example, at 618 the method may include determining a selection position on the element where the touch selection of the element was received. At 622 the method may include establishing a second rotation scaling factor that is based on a distance between the selection position and the element point of reference. In one example, the second rotation scaling factor may comprise the selection position rotation scaling factor as described above. At 626 the method may include determining the rotation amount based on the second rotation scaling factor in addition to the first rotation scaling factor. At 630 the method may include rotating the element by the rotation amount to a second orientation. In one example and as described above, the rotation amount may comprise a maximum rotation that is multiplied by the first rotation scaling factor and by the second rotation scaling factor.

At 634 the method may include establishing a first size scaling factor that is based on a distance between a position of the element and the display point of reference. As described above, in one example the first size scaling factor may comprise the element position size scaling factor. At 638 the method may include establishing a second size scaling factor that is based on a distance between the selection position on the element and the element point of reference. As described above, in one example the second size scaling factor may comprise the selection position size scaling factor. At 642 the method may include establishing a selected size scaling factor that is the smaller of the first size scaling factor and the second size scaling factor. At 646 the method may include determining a second size of the element by multiplying the first size of the element by the selected size scaling factor.

At 650 the method may include displaying the element in the second orientation, as described above, on the display 14. At 654, the method may also include displaying the element in the second size, as described above, on the display 14.

It will be appreciated that the above described systems and methods may be utilized to provide consistent and realistic visual feedback indicating a touch selection of an element on a display. These systems and methods may also provide such feedback independent of the resolution of the display. In this manner, effects caused by the perspective angle projection matrix of a render camera may be offset. This enables a more realistic depiction of an element being "pressed" to be provided to a user.

As mentioned above, computer readable storage media may be provided to store and/or transfer data and/or instructions executable to by the processor of the computing device to implement the herein described methods and processes. The computer-readable storage media are physical devices that may take the form of CDs, DVDs, HD-DVDs, Blu-Ray Discs, EEPROMs, and/or floppy disks, among others. Thus, the computing device described above may be provided with appropriate drives or readers to read computer readable storage media of these formats. It will be appreciated that the computer readable storage media are non-volatile storage media and thus instructions may be stored on the computer readable storage media in a non-transitory manner. These instructions may be read from the computer readable storage media and stored on mass storage of the computing device, to be implemented by the processor using portions of memory.

The term "engine" and "program" are used herein to refer to software that performs one or more particular functions when executed by a processor of a computing device. These terms are meant to encompass individual or groups of executable files, data files, libraries, drivers, scripts, and database records, for example. The embodiments described herein show one example organization of such programs and engines. However, it should be appreciated that the functions described herein may be accomplished by differently organized software components.

It is to be understood that the example embodiments, configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

Components, process steps, and other elements that may be substantially the same in one or more embodiments are identified coordinately and are described with minimal repetition. It will be noted, however, that elements identified coordinately may also differ to some degree.

The subject matter of the present disclosure includes all novel and nonobvious combinations and subcombinations of the various methods, systems and configurations, and other features, functions, acts, and/or properties disclosed herein, as well as any and all equivalents thereof.

In some embodiments, the above described methods and processes may be tied to a computing system including one or more computers. In particular, the methods and processes described herein may be implemented as a computer application, computer service, computer API, computer library, and/or other computer program product.

The invention claimed is:

1. A method for providing visual feedback to a user indicating a touch selection of an element in a graphical user interface on a touch-sensitive display, the element rotatable upon receiving the touch selection, the graphical user interface being displayed by a rendering engine program having a render camera with an axis of projection intersecting a display point of reference, comprising:
 displaying the element in a first orientation on the display;
 establishing a rotation scaling factor that is based on at least a distance between an element point of reference and the display point of reference, wherein a location of the element point of reference and a location of the display point of reference are both independent of a location of the touch selection of the element, and the rotation scaling factor is independent of the location of the touch selection of the element;
 determining a rotation amount of the element based on at least the rotation scaling factor;
 receiving the touch selection of the element via the user touching a surface of the display;
 rotating the element by the rotation amount to a second orientation; and
 displaying the element in the second orientation on the display.

2. The method of claim 1, wherein the rotation amount comprises a maximum rotation multiplied by the rotation scaling factor.

3. The method of claim 2, further comprising determining the maximum rotation by comparing an element size to a display size.

4. The method of claim 3, wherein the element size is an element width and the display size is a display width.

5. The method of claim 4, wherein the maximum rotation varies between about 25 degrees when the element width is less than or equal to about 25% of the display width, and about 10 degrees when the element width is about 100% of the display width.

6. The method of claim 1, wherein the rotation scaling factor varies between about 1.0 when the distance between the element point of reference and the display point of reference is about 0.0, and about 0.333 when the distance between the element point of reference and the display point of reference is about a maximum value.

7. The method of claim 6, wherein the display point of reference comprises a center of the display, and the maximum value of the distance between the element point of reference and the center of the display corresponds to the element point of reference being at an edge of the display.

8. The method of claim 1, wherein the rotation scaling factor is a first rotation scaling factor, further comprising:
 determining a selection position on the element where the touch selection of the element is received;
 establishing a second rotation scaling factor that is based on at least a distance between the selection position and the element point of reference; and
 wherein determining the rotation amount of the element further comprises determining the rotation amount based on at least the first rotation scaling factor and the second rotation scaling factor.

9. The method of claim 8, wherein the second rotation scaling factor varies between about 1.0 when the selection position is at an edge of the element and about 0.0 when the selection position is at the element point of reference.

10. A computing device for providing visual feedback to a user indicating a touch selection of an element in a graphical user interface, comprising:
 a display having a touch-sensitive surface and a display point of reference;
 a rendering engine program including a render camera with an axis of projection intersecting the display point of reference, the rendering engine program configured to:
  display the element in a first orientation on the display;
  establish an element position rotation scaling factor that is based on at least a distance between an element point of reference and the display point of reference, wherein a location of the element point of reference and a location of the display point of reference are both independent of a location of the touch selection of the element, and the element position rotation scaling factor is independent of the location of the touch selection of the element;

determine a rotation amount of the element based on at least the element position rotation scaling factor;

receive the touch selection of the element via the user touching the touch-sensitive surface of the display;

rotate the element by the rotation amount to a second orientation; and display the element in the second orientation on the display.

11. The computing device of claim 10, wherein the rotation amount comprises a maximum rotation multiplied by the element position rotation scaling factor.

12. The computing device of claim 11, further comprising determining the maximum rotation by comparing an element size to a display size.

13. The computing device of claim 12, wherein the element size is an element width and the display size is a display width.

14. The computing device of claim 13, wherein the maximum rotation varies between about 25 degrees when the element width is less than or equal to about 25% of the display width, and about 10 degrees when the element width is about 100% of the display width.

15. The computing device of claim 10, wherein the element position rotation scaling factor varies between about 1.0 when the distance between the element point of reference and the display point of reference is about 0.0, and about 0.333 when the distance between the element point of reference and the display point of reference is about a maximum value.

16. The computing device of claim 15, wherein the display point of reference comprises a center of the display, and the maximum value of the distance between the element point of reference and the center of the display corresponds to the element point of reference being at an edge of the display.

17. The computing device of claim 10, the rendering engine program further configured to:

determine a selection position on the element where the touch selection of the element is received;

establish a selection position rotation scaling factor that is based on at least a distance between the selection position and the element point of reference; and determine the rotation amount based on at least the element position rotation scaling factor and the selection position rotation scaling factor.

18. The computing device of claim 17, wherein the selection position rotation scaling factor varies between about 1.0 when the selection position is at an edge of the element and about 0.0 when the selection position is at the element point of reference.

19. A method for providing visual feedback to a user indicating a touch selection of an element in a graphical user interface on a touch-sensitive display, the element rotatable and scalable upon receiving the touch selection, the graphical user interface being displayed by a rendering engine program having a render camera with an axis of projection intersecting a display point of reference, comprising:

displaying the element in a first orientation and a first size on the display;

establishing an element position rotation scaling factor that is based on a distance between an element point of reference and the display point of reference, wherein a location of the element point of reference and a location of the display point of reference are both independent of a location of the touch selection of the element, and the element position rotation scaling factor is independent of the location of the touch selection of the element;

receiving the touch selection of the element via the user touching a surface of the display;

determining a selection position on the element where the touch selection of the element was received;

establishing a selection position rotation scaling factor that is based on a distance between the selection position on the element and the element point of reference;

determining a rotation amount of the element based on the element position rotation scaling factor and the selection position rotation scaling factor;

rotating the element by the rotation amount to a second orientation, the rotation amount comprising a maximum rotation multiplied by the element position rotation scaling factor and by the selection position rotation scaling factor;

establishing an element position size scaling factor that is based on the distance between the element point of reference and the display point of reference;

establishing a selection position size scaling factor that is based on the distance between the selection position on the element and the element point of reference;

establishing a selected size scaling factor that comprises the element position size scaling factor or the selection position size scaling factor, whichever is smaller;

determining a second size of the element by multiplying the first size of the element by the selected size scaling factor; and displaying the element in the second orientation and the second size on the display.

20. The method of claim 19, wherein the element position size scaling factor comprises a first value when the element point of reference is at a center of the display, the element position size scaling factor comprises a second value that is less than the first value when the element point of reference is at an edge of the display, the selection position size scaling factor comprises the first value when the selection position is at the edge of the element, and the selection position size scaling factor comprises the second value when the selection position on the element is at the center of the element.

* * * * *